Patented May 29, 1951

2,555,232

UNITED STATES PATENT OFFICE 2,555,232

METHOD OF PREPARING A SHRIMP PRODUCT

Edgar Pipes Guice and Eldon Edward Hickey, Ocean Springs, Miss.

No Drawing. Application March 7, 1949, Serial No. 80,101

4 Claims. (Cl. 99—111)

Our invention relates to prepared food products and method of preparing same, and has for its object to provide a delicacy consisting of shrimp meat, produced by fibering and shredding the deveined raw meat from small and broken shrimp, after picking and shelling such shrimp by removing the shells, while fresh as distinguished from shrimp cooked or steamed in the usual way, preferably as hereafter set forth, and especially with the meat fibered and shredded in a manner whereby the long fibers in the tail of the shrimp are retained at their normal length, and not comminuted into short pieces or lengths, so as to act as a necessary reinforcing agent in the aggregate when placed in molds or curved or crescent shaped dies in which the aggregate is layered and heated until solidified, taking the shape of the mold or die which we propose to make in the likeness of the jumbo or larger size shrimp, which are of greater market value.

The shrimp meat when fibered and shredded, consists of an intertangled mass of fiber, surrounded by the natural protoplasmic substances and jelly-like constituents characteristic of the shrimp. When the fibrous mass is placed in a die or mold and subjected to approximately 210° F. and 10 lbs. pressure, the protoplasm and jelly-like substance will solidify simultaneously with the forming of a skin or covering thereover, which will take the natural coloring of cooked shrimp meat and form a membranous coating or jacket to retain the shape or form of the meat to simulate the appearance of the large or jumbo varieties of more readily marketable shrimp. At the same time this molded aggregate will present a product which will possess all the flavor of the young and smaller varieties of these crustaceans and the marketable advantage of those of the largest size, and may be quick frozen without bleeding or excreting when thawed out for consumption.

A further object of our invention is to provide a method for treating the meat of broken pieces and small and less marketable shrimp, fibered and shredded, preferably in the form of long fibers whereby it may be molded into any desired form such as large shrimp, loaf form or other shapes and will maintain its shape and yet retain the succulence and color of the natural product fresh from the sea. This adds a valuable factor to the shrimp industry by increasing the market demand for the small more favorable sizes of shrimp, it being recognized that the larger percentage of a catch of shrimp is composed of the smaller sizes having but a small market demand.

To these and other ends my invention comprises further improvements and advantages as will be further described in the accompanying specification, the novel features thereof being set forth in the appended claims.

It is a recognized fact in the shrimp industry that the so-called jumbo shrimp, or in the Southern States adjacent the Gulf of Mexico, the so-called large Gulf shrimp, command a better market price than the smaller variety. This is due to the prevalent use of shrimp as an apéritif in formal meals because of its high caloric and protein value, and generally referred to as a cocktail. For such servings these large shrimp are desired by restaurateurs, caterers and housewives, because it is possible to arrange them in festoon formation around the rim of a small shallow glass or other receptacle containing an appetizing sauce. The consequence is that all of the smaller young and undeveloped shrimp in a catch which are the more numerous, are unserviceable for the purposes mentioned, yet they are more tender morsels and possess a more delicious flavor than when full grown to popular marketable size. However, when cooked they cannot be quick frozen without bleeding or excreting and losing their flavor or appetizing value and breaking up or disintegrating upon being thawed out.

In carrying out our invention we first pick the small and broken non-saleable shrimp. Next we shred and fiber the meat lengthwise thus leaving the fibers thereof as long as possible, and obtain therefrom the protoplasm in sufficient quantities to form a bonding agent to facilitate cohesion and shaping of the fibers in molds assimilating large shrimp or any other form desired. Before fibering the shrimp we further provide a more sanitary shrimp meat product by first removing the highly decomposing matters contained in the vein or gut of the small raw, picked clean shrimp meat. This procedure renders the separate broken and small shrimp more sanitary for human consumption and is now not a practice in the industry. This art further advances more lasting qualities by such method of removing said highly decomposing matter.

With specially designed machinery for shredding and fibering the raw, deveined meat which is high in calories and protein matters, the cellular structure of the meat is broken down and ruptured, excreting therefrom to a maximum degree, the cell fluids, such as moisture, extracts and jellifying protoplasms, some of which are necessary as a bonding agent for the aggregate.

Having thus obtained an aggregate of shredded long fibered shrimp meat, we layer the aggregate in curing molds in proposed shape of the largest or jumbo-jumbo size, or any other desired form or shape. Heat is then applied to the mold and is maintained until the protoplasm jellies set. On the other hand should it be desired to have a cooked product, the filled molds are then subjected to a sufficient temperature of approximately 215° F. until completely cooked in steam jacketed dies or molds.

In any desired shape, the searing of the meat so layered and molded with heat results in a product in likeness to the type of die or mold chosen, while the searing makes the product retain practically all of the natural juices, flavors and vitamin substances. If desired, such shaped and compressed bodies may be quick frozen and will better withstand thawing since they will not bleed or secrete due to changing of the cellular structure. This makes it possible to use the broken parts and under size but tender young shrimp to produce shrimp food products profitably, thereby conserving these tender more flavorful morsels, so that the same can be quick frozen or processed in cans and kept in edible condition, thereby offering a more attractive delicacy to the consumer from meat of small shrimp having little or low sale value. This is very important since present cooked-peeled shrimp, even in the larger sizes which have high marketable value when canned, cannot be successfully frozen, due to the fact that the normal liquids contained in the cells will result in bleeding and secretion on thawing and will result in small prism ice crystal formations caused by the thawing rupture to a point rendering it non-saleable which is entirely avoided by the present product and method.

The temperature, time and pressure may be varied somewhat and the essential factor thus obtained causes the formation of a skin or coating on the molded form of the solidified shrimp. The heat and pressure applied to the mold tends to blister or sear the crustacean contents thus providing it with what may be termed a new skin, or covering over the entire surface of the thus prepared meat when shaped or molded and subjected to heating as specified to maintain its shape and appearance simulating large shrimp.

An additional advantage is formed in thus making assimilated shrimp products, whether the ingredients remain raw or are cooked, in that the gut and the tough fiber which exists in the large shrimp in its natural form is eliminated.

If desired, these large size molded or cooked artificial shrimp may be packaged for refrigeration and shipment as a frozen product, or they may be canned according to standard practice.

Further, this process whereby the shrimp meat is shredded into a bulk, lends itself to a thorough mixing with sodium chloride (salt) for furthering the sanitation and preservation of the meat and the finished product one-half of one percent being preferred. In a similar manner suitable sauces, spices, and other flavoring agents may be added to the shredded aggregate merely by inducing the same to the mixing chamber of the proposed assimilating machine. This results in a more desirable sea food product, ready to cook, broil or fry, and provides a new shrimp product for the market, having the likeness of a large shrimp.

Furthermore, an outstanding advantage of this process, is the formation of a new skin caused by searing of the meat when in contact with the hot mold. This inherent characteristic of shredded shrimp meat, lends itself to a variety of shrimp meat products, heretofore not produced, such as shrimp sausage, patties, cakes, loafs, and the like, all housed within their own casing or skin.

The cooked or ground assimilated shrimp meat may further be used as an ingredient in many food products. It is suggested that shrimp cakes or patties of outstanding flavor and quality may be had, for example: by the mixing of an additional 65% of mashed boiled Irish potatoes, 5% of chopped green pepper, a small quantity of pimento, grated lemon peels, bay leaves, and seasoned to taste. The cakes may be frozen or processed in cans in conventional method, and marketed as a ready to eat product.

The process above set forth for treating the small shrimp having little profitable marketable value is not alone important because of its conversion into one of high commercial and sanitary value, but also because the delicate taste and attractive color of this variety or grade of shrimp the resultant product is a relish especially appreciated by epicures.

The assimilated shrimp product, as above described may be dried and dehydrated where freezing or canning facilities are not available, with excellent results.

We claim:

1. The method of preparing a large simulant shrimp from small and broken unmarketable shrimp consisting of taking broken pieces and small raw picked cleaned shrimp meat, first deveining said shrimp meat, shredding the individual raw meat into fibers and at the same time breaking down and rupturing the cellular structure of said meat, thereby voiding to a maximum degree the existing extracts and moisture including the jellifying protoplasm therein contained to prevent quick freezing of the product without formation of ice crystals, adding a sufficient quantity of curative and preservative consisting of sodium chloride to exposed tissues, molding these shredded fibers in layers to resemble shrimp and cooking and setting the jellifying protoplasm of the aggregate at approximately 210° F. at 10 pounds pressure and also searing the product to produce a new skin on the exterior for holding the delicate tender fibers in a sure bond, said deveined meat being then kettle cooked and canned in its similant large shrimp form.

2. The method of preparing a large simulant shrimp from small and broken unmarketable shrimp consisting of taking broken pieces and small raw picked clean shrimp meat, first deveining the meat, shredding the individual raw meat into fibers and at the same time breaking down and rupturing the cellular structure of said meat, thereby voiding to a maximum degree, the existing extracts and moisture including the jellifying protoplasm therein contained to permit quick freezing of the product, adding a curative and preservative compound to the exposed tissues of the deveined meat, layering these shredded fibers while molding the fibers to form large simulant shrimp, searing the molded product to produce a new skin on the exterior, formed entirely from the shrimp meats own protoplasm jellies.

3. The method of preparing a large simulant shrimp from small and broken unmarketable shrimp consisting of taking broken pieces and small raw picked cleaned shrimp meat, first removing the highly decomposing matter such as in the vein therefrom to prevent unsanitary and objectionable cooking odors, shredding the individual raw meat into fibers and at the same time breaking down and rupturing the cellular structure of said meat, thereby voiding to a maximum degree the existing extracts and moisture including the jellifying protoplasm therein contained to permit quick freezing of the product, adding one-half of 1% of sodium chloride as a curative and preservative to the exposed tissues, layering these shredded fibers in the molded form of shrimp and cooking and setting the jellifying protoplasm of the aggregate at approximately 210° F. at 10 pounds pressure, to produce a new skin on the exterior for holding these delicate tender fibers in a sure bond, said deveined meat being then kettle cooked and canned in its assimilated shrimp form.

4. The method of preparing a large simulant shrimp from small and broken unmarketable shrimp consisting of taking broken pieces and small raw picked clean shrimp meat, first deveining the meat, shredding the individual raw meat into fibers and at the same time breaking down and rupturing the cellular structure of said meat, thereby voiding to a maximum degree the existing extracts and moisture including the jellifying protoplasm therein contained to permit quick freezing of the product, adding sodium chloride for a curative and preservative to the exposed tissues, molding these shredded fibers in layers to form a simulated shrimp and cooking and setting the jellifying protoplasm of the aggregate at approximately 210° F. at 10 pounds pressure and also searing the product to produce a new skin on the exterior formed entirely from the shrimp meats own protoplasm jellies and effectively sealing the flavor and nutriment within the assimilated product.

EDGAR PIPES GUICE.
ELDON EDWARD HICKEY.

REFERENCES CITED

The following references are of record in the file of this patent:

UNITED STATES PATENTS

| Number | Name | Date |
|---|---|---|
| 1,989,383 | Schuh | Jan. 29, 1935 |
| 2,263,694 | Grayson | Nov. 25, 1941 |
| 2,271,272 | Minde | Jan. 27, 1942 |
| 2,365,519 | Bloedorn | Dec. 19, 1944 |

OTHER REFERENCES

"The American Woman's Cook Book," 1945, by Ruth Berolzheimer, published by Consolidated Books Publishers, Chicago, pages 224 and 225.